United States Patent [19]

Bonar

[11] 4,404,591

[45] Sep. 13, 1983

[54] SLIT RADIOGRAPHY

[75] Inventor: David C. Bonar, Shelton, Conn.

[73] Assignee: North American Philips Corporation, New York, N.Y.

[21] Appl. No.: 337,031

[22] Filed: Jan. 4, 1982

[51] Int. Cl.[3] .............................................. H04N 7/18

[52] U.S. Cl. ...................................... 358/111; 378/99

[58] Field of Search .......................... 358/111; 378/99

[56] References Cited

U.S. PATENT DOCUMENTS

| | | | |
|---|---|---|---|
| 2,730,566 | 1/1956 | Bartow | 378/99 |
| 4,179,100 | 12/1979 | Sashin | 378/99 |
| 4,185,198 | 1/1980 | Fujimoto | 378/99 |
| 4,188,537 | 2/1980 | Franke | 378/99 |
| 4,366,574 | 12/1982 | Hill | 378/99 |

OTHER PUBLICATIONS

*Rev. Sci. Instrum.*, 49(9), (Sep. 1978), pp. 1241-1249, Reynolds, "High Sensitivity Image Intensifier-TV Detector for X—ray Diffraction Studies".

Rudin, S., "Fore-and-Aft Rotating Aperture Wheel (RAW) Device for Improving Radiographic Contrast," Proc. SPIE, vol. 173, p. 98.

Yester, M. V., Barnes, G. T., and King, M. A., "Experimental Measurements of the Scatter Reduction Obtained in Mammography with a Scanning Multiple Slit Assembly," Med. Phys. 8, p. 158, (1981).

Jaffe, C., and Webster, E. W., "Radiographic Cointrast Improvement by Means of Slit Radiography," Radiology, vol. 116, 631, (1975).

Sorenson, J. A., and Nelson, J. A., "Slit Radiography: Problems and Potential," SPIE vol. 233, 240, (1980).

Wagner, R. F., Barnes, G. T., and Askins, B. S., "Effect of Reduced Scatter on Radiographic Information Content and Patient Exposure: A Quantitative Demonstration," Med. Phys. 7, 13 (1980).

Barnes, G. T. and Brezovish, I. A., "The Design and Performance of a Scanning Multiple Slit Assembly," Med. Phys. 6, 197, (1979).

Amplatz, K., Crass, J., Moore, R., Korbuly, D., Kotula, F., and Castaneda-Zuniga, W. R., "Changerless Peripheral Angiography: A New Concept," Radiology 137, 213, (1980).

Motz, J. W., and Danos, M., "Image Information Content and Patient Exposure," Med. Phys. 5, 8, (1978).

Riederer, S. J., Kruger, R. A., and Mistretta, C. A., "Three-Beam K-edge Imaging of Iodine Using Difference Between Fluoroscopic Video Images: Theoretical Considerations," Med. Phys. 8, 471, (1981).

Riederer, S. J., Kruger, R. A., Mistretta, C. A., Ergun, D. L., and Shaw, C. G., "Three-Beam K-ede Imaging of Iodine Using Differences Between Fluoroscopic Video Images: Experimental Results," Med. Phys. 8, 480, (1981).

Mistretta, C. A., "X-Ray Image Intensifiers," *The Physics of Imaging: Recording System Measurements and Techniques,* Summer School at Un. of N.C., AAPM, (1979), p. 393.

Wagner, L. K. Cohen, G., Wong, W-H, and Amtey, S. R., "Dose Efficiency and the Effects of Resolution and Noise on Detail Perceptibility in Radiographic Magnification," Med. Phys. 8, 24 (1981).

*Primary Examiner*—Howard Britton
*Attorney, Agent, or Firm*—Jack E. Haken

[57] ABSTRACT

In radiography apparatus a moving slit collimator is disposed between an X-ray source and a patient undergoing examination. Radiation is detected with an X-ray image intensifier and television pickup chain. The field of view of the television pickup is limited to that area of the output screen of the X-ray image intensifier which corresponds to the image produced by direct radiation which passes through the moving slit. The view of the television pickup may be limited by a second slit, disposed between the X-ray image intensifier and television pickup which moves in synchronism with the first slit. Alternately, the view of a television pickup may be limited by synchronizing scan signals for the pickup of the with the motion of the slit collimator.

16 Claims, 2 Drawing Figures

SLIT RADIOGRAPHY

The invention relates to methods and apparatus for reducing the effects of glare, scatter, and off-focal radiation in the practice of slit radiography.

BACKGROUND OF THE INVENTION

Slit radiography has been known for many years as a technique for reducing the background noise which is generated by X-ray scatter during medical radiography. In the prior art, a first collimator, which typically includes a long, narrow slit, is disposed between an X-ray source and a patient undergoing examination. A second corresponding slit is disposed between the patient and an X-ray detector. Typically, the X-ray detector will comprise an X-ray sensitive phosphor screen, a sheet of X-ray film, or the input screen of an X-ray image intensifier tube. The slits in the two collimators are moved in synchronism. The first slit assures that only a small area of the patient is illuminated with X-rays at any time. The second slit assures that only radiation which travels on a direct path from the X-ray source reaches the detector. The slits move to scan an entire field of view on the patient.

Background noise in a radiography system arises from three principal sources: direct X-ray scatter, image intensifier glare, and off-focal radiation. Scatter is principally X-rays produced in the patient by the Compton effect but also includes some coherent (Rayleigh) scatter and some indirect photoelectric effect scatter. Scatter, together with photoelectric absorption, forms a conventional X-ray image by subtracting photons from a primary radiation beam at various points in the patient.

In systems which utilize an X-ray image intensifier, an X-ray image is converted into an intensified visible light image. The X-rays are first converted to lower energy photons in a scintillation layer at the input screen of the intensifier. The lower energy photons diffuse to a photocathode where they produce an electron image. The electrons are accelerated through an electron optical structure and strike a fluorescent output screen where they are converted into visible photons. Glare may be produced at each step: the X-rays may scatter in the input window and scintillation layer of the tube; the low energy photons may be scattered as they diffuse to the photocathode; the electron image can undergo aberrations which contribute to glare; and light produced in the fluorescent output screen can partially scatter or reflect before it is transmitted out of the intensifier.

X-ray radiation is usually produced in an X-ray tube as Bremsstrahulang or characteristic radiation from a beam of primary electrons which bombards a focal spot on a metal anode. The anode also elastically scatters some secondary electrons. The tube electron optics are generally not designed to focus secondary electrons and they usually strike the anode and generate X-rays far away from the focal spot of the primary electron beam. The tube thus comprises an extended source of radiation having a complicated configuration. Radiation from the focal spot can also be scattered by the output window and filter in the port of the X-ray tube to produce off-focal radition.

SUMMARY OF THE INVENTION

In accordance with the invention, a light collimator is provided between the output screen of an X-ray image intensifier and the input of a television pickup. The light collimator moves in synchronism with an X-ray collimator slit which is disposed between the X-ray source and the patient. The light collimator slit restricts the field of view of the television pickup to a limited area on the output screen of the image intensifier which corresponds to a portion of the image produced by direct radiation which reaches the input screen of the intensifier through the X-ray collimator slit. The light collimator prevents glare produced in the image intensifier tube from reaching the television pickup and contributing to background noise in the system and reduces the effects of off-focal radiation and scatter.

In a preferred embodiment of the invention, a collimation effect at the input to the television pickup is achieved by limiting an electrical scan in the television pickup to areas on a photosensitive face which correspond to a portion of the image which is formed by direct radiation which passes through the X-ray collimator slit. The scan is synchronized with the motion of the X-ray collimator slit. The slit in the X-ray collimator may comprise a long rectangular opening which is aligned with its longitudinal dimension perpendicular to a linear motion of the collimator. In this case the pickup is electrically scanned with a rectangular raster scan having horizontal lines parallel to the longitudinal dimension of the opening and a vertical scan which is synchronized with its motion. Alternatively, the X-ray collimator may be a disc with a sector shaped opening in which case the electrical scan of the pickup is in a polar geometry. The pickup may comprise a vidicon or other vacuum tube television pickup or it may comprise a solid state array.

An additional synchronized X-ray collimator slit may be disposed between the patient and the input screen of the image intensifier to further reduce the effect of X-rays scattered in the patient. A further synchronized X-ray collimator slit may be provided at the output window of the X-ray source, between the source and the first X-ray collimator to reduce the background effects of off-focal radiation in the tube.

BRIEF DESCRIPTION OF THE DRAWINGS

The invention may be better understood by reference to the attached drawings in which.

DESCRIPTION OF THE PREFERRED EMBODIMENT

Figure 1:
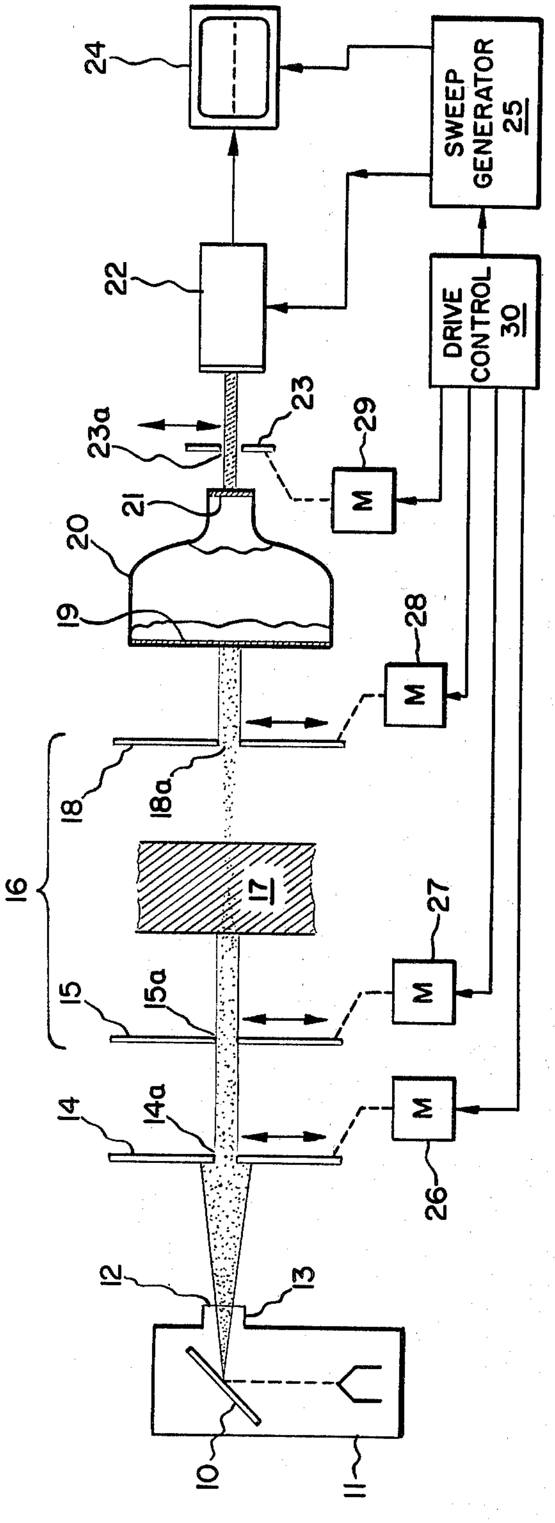
FIG. 1 schematically represents an X-ray pickup chain having rectangular slit collimators and FIG. 2 schematically represents an X-ray pickup chain having sector-shaped disc collimators.

FIG. 1 is an X-ray pickup chain which incorporates the improved slit radiography apparatus of the present invention. X-ray radiation is generated at the anode 10 of an X-ray tube 11 and exits the tube through an output window 12 at the tube port 13. Radiation from the tube is projected through a pair of X-ray collimators 14 and 15 (more particularly described below), through an examination area 16 which includes a patient to be examined 17 through a third X-ray collimator 18 and onto the input screen 19 of an X-ray image intensifier tube 20. The X-ray image intensifier tube functions in a manner well known in the art to produce a visible image on an output window 21 which corresponds to the X-ray image formed on the input window 19. A television pickup 22, which may, for example, comprise a vidicon tube or a solid state light detecting array, it is disposed to view the image on the output screen 21 through a light collimator 23. The television pickup 22 produces a video signal which may, for example, be displayed on a television monitor 24. The television pickup 22 produces the video signal by sequentially scanning image detecting elements which may, for example, be in a matrix on the face of a vidicon tube. The scan of the pickup is synchronized with the scan of the cathode ray tube of the television monitor 24; both scans being controlled by a sweep generator 25.

The collimators 14, 15, 18 and 23 comprise radiation-absorbing material (which in the case of X-ray collimators 14, 15 and 18 may be lead and in the case of light collimator 23 may be metal or plastic) which defines a non-absorbing rectangular slit (14*a*, 15*a*, 18*a* and 23*a*) aligned with its longitudinal dimension perpendicular to the plane of the drawing in FIG. 1. The collimators are movable in the vertical direction and are moved therein by motors 26, 27, 28 and 29 via drive mechanisms which are indicated schematically as dashed lines in which may, for example, comprise racks and pinions. The motors are powered by a drive control circuit 30 which maintains the slits 14*a*, 15*a* and 18*a* in alignment along a common line during their motion. Slits 15*a* and 18*a* thus function in the manner of prior art slit radiography apparatus to limit direct radiation from the source to a small portion of the input screen 19. The slit collimator 23 moves in synchronism with the motion of the slit collimators 14, 15 and 18, and is maintained in functional alignment therewith under control of the drive control 30, so that it limits the field of view of the TV pickup 22 to a small area on the output screen 21 of the X-ray image intensifier which contains an image which corresponds to X-ray intensity on the small area of the input screen which receives direct radiation from the source through the slits in collimators 14, 15 and 18.

In a preferred embodiment of the invention, the vertical sweep produced by the sweep generator 25 and applied to the TV pickup 22 to read out image information is synchronized with the motion of the slit collimators so that the pickup tube is, at all times, producing an electrical output signal from light which is emitted from that portion of the output screen which images direct radiation through the slits. In a preferred embodiment, the sweep generator first scans a horizontal line on the face of the pickup tube immediately before light from the direct radiation area of the output screen 21 reaches the pickup. The first sweep erases any information on the face of the tube which may be attributable to background radiation glare, scatter or off-focal radiation. Light from the output screen then produces a direct primary light image on the swept area of the pickup tube and the sweep generator produces a second horizontal line which reads out this information to the television monitor. The sequence is repeated for all lines in the TV image.

In an alternate embodiment of the invention, light collimator 23 may be eliminated and the sweep generator synchronized with the motion of X-ray collimators 14, 15 and 18.

Figure 2:
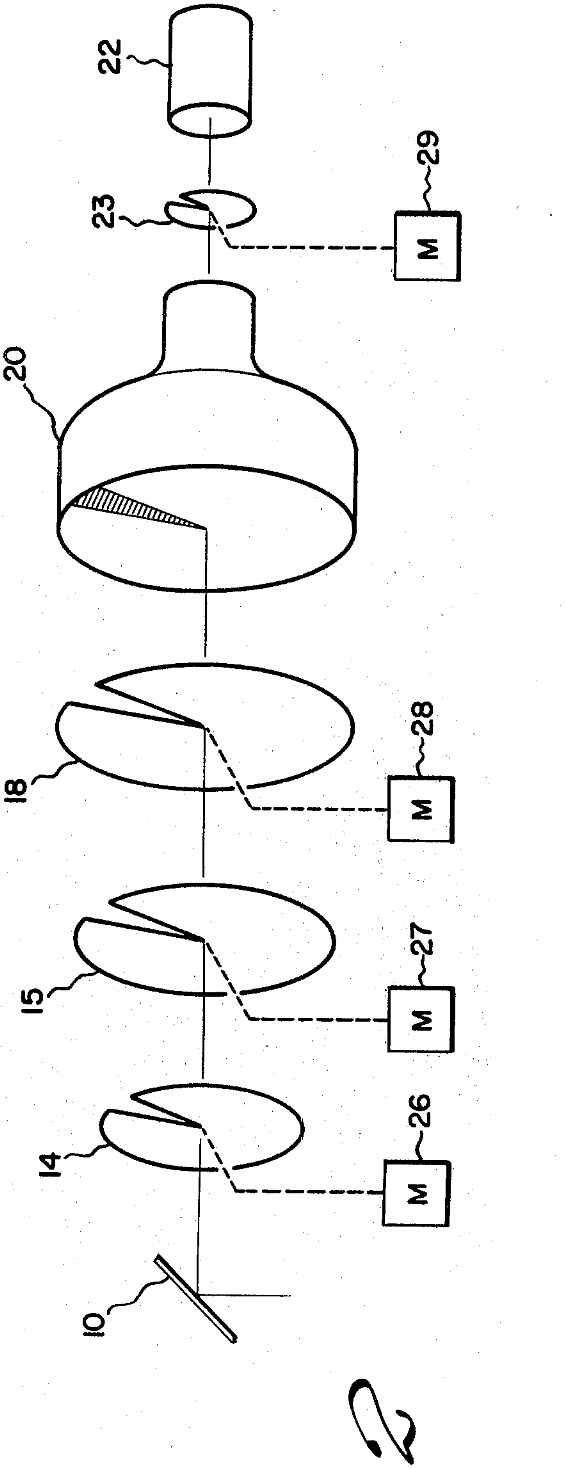

FIG. 2 illustrates an alternate embodiment of the radiography apparatus of FIG. 1 wherein the collimators comprise rotating discs which are provided with sector shaped slit openings and which rotate in synchronism around a common axis. The axis may be disposed outside of the field of view of the X-ray image intensifier or may, advantageously be disposed within the field of view of the image intensifier, that is: between the source and the input screen, as illustrated in FIG. 2. In that case the collimators 14, 15, 18 and 23 are most advantageously supported and driven at their peripheries by motors 26, 27, 28 and 29 under synchronous control from the drive 30. The sweep of the pickup tube may also, in this embodiment, be synchronized with the motion of the collimator discs in which case the sweep of the pickup tube may be in a polar geometry of the type used in pulse position radar displays.

Further details of the construction of slit collimators having rotating and scanning geometries are described in Rudin, S. "Fore-and-Aft Rotating Aperture Wheel (RAW) Device For Improving Radiographic Contrast," Procedings SPIE Vol. 173 page 98. and Barnes G. T. in Brezovich, I.A., "The Design and Performance of a Scanning Multiple Slit Assembly," Med. Phys. 6, 197 (1979), which are incorporated herein, by reference, as background material.

If the disc axis is located within the field of view of the X-ray image intensifier in the apparatus of FIG. 2 there is a possibility that an artifact will be produced at the point on the image corresponding to the axis since, at some point, the width of the focal spot will excede the width of the aperture. If only one collimator is used, the rotation of the collimator will produce an average image. However, a combination of two or more collimators will discriminate against radiation as the center of the collimator is approached. The artifact can be reduced if one of the collimators, for example, collimator 15, is utilized as the beam defining device. This can be accomplished by making the opening in the beam defining collimator narrower than the openings in the remaining collimators and by enlarging the apertures in the other collimators as required to allow the entire primary beam to pass through.

I claim:

1. In a radiography system which includes:

source means which function to direct X-ray radiation through an examination area;

an X-ray image intensifier having an input screen which is disposed to receive radiation from the source means which has passed through the examination area and an output screen for producing an intensifed visible image which corresponds to radiation impinging on the input screen;

television pickup means disposed to view the output screen which function to produce a television signal corresponding to an image thereon; and first scanning means which define and move a first X-ray collimator slit disposed between the source means and the examination area and which functions to limit direct radiation from the source means to a limited portion of the input screen;

the improvement comprising second scanning means which function, in synchronism with the motion of the first collimator slit, to limit the view of the television pickup means to a limited area of the output screen on which the image corresponds to radiation on the limited area of the input screen which receives direct radiation from the source means through the first slit.

2. The apparatus of claim 1, wherein:

the second scanning means comprises a second diaphragm which defines a second light collimator slit disposed between the output screen and the television pickup means and means for moving the second diaphragm so that the second slit is functionally aligned with and moves in synchronism with the first slit.

3. The apparatus of claim 1 or 2, further comprising means for scanning an image sensitive area of the television pickup means to produce a signal therefrom and wherein the second scanning means functions to limit the scan of the image sensitive area to limited portions thereof which view the said limited area of the output screen.

4. The apparatus of claim 3, wherein the means for scanning the image sensitive area further function to discharge background image information from the limited portions of the image sensitive area before producing a signal which corresponds to an image produced by direct radiation.

5. The apparatus of claim 4, wherein the television pickup means is a vidicon tube.

6. The apparatus of claim 3 where the television pickup means is a solid state array.

7. The apparatus of claim 2 wherein the first and second slits are rectangular and wherein the first and second scanning means move the slits perpendicular to the longitudinal dimension of the slits.

8. The apparatus of claim 2 wherein the first and second slits are sectors of circles disposed on a common axis and wherein the first and second scanning means function to rotate the first and second slits around the common axis.

9. The apparatus of claim 8 wherein the common axis is within a field of view of the input screen of the image intensifier.

10. The apparatus of claim 1 or 2 further comprising third diaphragm means which define a third collimator slit disposed between the examination area and the input screen of the X-ray image intensifier means and means for moving the third diaphragm means so that the third slit is aligned with and moves in synchronism with the first slit.

11. The apparatus of claims 1 or 2 further comprising fourth diaphragm means which define a fourth collimator slit disposed between the source means and the first slit and means for moving the fourth diaphragm means so that the fourth slit is aligned with and moves in synchronism with the first slit.

12. The apparatus of claim 10 further comprising fourth diaphragm means which define a fourth collimator slit disposed between the source means and the first slit and means for moving the fourth diaphragm means so that the fourth slit is aligned with and moves in synchronism with the first slit.

13. The apparatus of claim 3 wherein the first slit is rectangular, the first scanning means moves the first diaphragm perpendicular to the longitudinal dimension of the first slit and wherein the means for scanning produces a raster scan having a horizontal sweep which is functionally parallel to the longitudinal dimension of the first slit and a vertical sweep which is functionally parallel to the motion of the first slit.

14. In the method of slit radiography which includes the steps of:

directing X-ray radiation from an X-ray source, through an examination area and onto an input screen of an X-ray image intensifier;

operating the image intensifier to produce, on an output screen thereof, a visible image of the X-rays which are incident on the input screen;

viewing the output screen with a television pickup and scanning the pickup to produce a video signal which corresponds to the visible image;

collimating the X-ray radiation through x-ray collimator slit which is disposed between the source and the examination area to limit direct X-ray illumination of the input screen to a small portion thereof; and moving the X-ray collimator slit to progressively scan the examination area and to progressively illuminate adjacent portions of the input screen with X-ray radiation; the improvement comprising:

limiting the field of view of the television pickup to a small portion of the output screen on which the visible image corresponds to direct radiation which illuminates the input screen through the X-ray collimator slit.

15. The method of claim 14 wherein the steps of limiting the field of view of the television pickup comprise moving an optical collimator slit between the output screen and the television pickup in synchronism with the motion of the X-ray collimator slit.

16. The method of claim 14 or 15 wherein the steps of limiting the field of view of the pickup comprises electrically scanning a limited portion of a light sensitive of the pickup in synchronism with the motion of the X-ray collimator slit to produce a viedo signal.

* * * * *